United States Patent [19]

So et al.

[11] Patent Number: 4,717,621

[45] Date of Patent: Jan. 5, 1988

[54] LETTERING MATERIAL FOR FABRIC AND THE LIKE

[75] Inventors: Philip K. So, Waltham; John J. Pine, Arlington, both of Mass.

[73] Assignee: Bemis Associates, Inc., Watertown, Mass.

[21] Appl. No.: 656,793

[22] Filed: Oct. 1, 1984

[51] Int. Cl.$^4$ ............................................. C09J 7/02
[52] U.S. Cl. .................... 428/349; 156/230; 156/240; 428/41; 428/352; 428/354
[58] Field of Search ............... 428/40, 347, 349, 354, 428/346, 41, 200, 207, 216, 196, 90, 352, 913, 914, 202; 156/230, 240

[56] References Cited

U.S. PATENT DOCUMENTS

| | | | |
|---|---|---|---|
| 3,660,212 | 5/1972 | Liebe, Jr. ............................ | 428/41 |
| 4,078,113 | 3/1978 | Starbuck et al. ................... | 428/196 |
| 4,269,885 | 5/1981 | Mahn .................................. | 428/216 |
| 4,349,593 | 9/1982 | Blechstein ......................... | 428/354 X |
| 4,390,387 | 6/1983 | Mahn .................................. | 428/90 |
| 4,423,106 | 12/1983 | Mahn ................................. | 428/207 |
| 4,465,717 | 8/1984 | Crofts et al. ..................... | 428/200 X |

Primary Examiner—Thomas J. Herbert
Attorney, Agent, or Firm—Cesari and McKenna

[57] ABSTRACT

A multi-layer labelling material for attachment to a textile fabric or the like. Labelling material comprises an outer layer of plastic material that provides the visual display of an indicium cut from the material, a bonding layer of thermoplastic material bonded on one surface to the labelling layer and a layer of pressure-sensitive adhesive on the other surface of the bonding layer. The adhesive layer provides temporary adhesion of the indicium to the textile fabric until heat and pressure are applied to the indicium to activate the bonding layer. The bonding layer then forms a permanent bond to the fabric.

6 Claims, 1 Drawing Figure

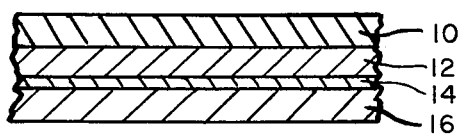

LETTERING MATERIAL FOR FABRIC AND THE LIKE

BACKGROUND OF THE INVENTION

This invention relates to plastic lettering which is adhered to textile fabrics by a thermoplastic bonding substrate. More particularly it relates to a bonding substrate that includes a tacky layer for temporarily adhering the lettering to the fabric prior to activation of the thermoplastic bonding material.

In recent years a large market has developed for alphanumeric characters and other indicia, having a plastic outer surface, which can be applied to textile fabrics. For example, on athletic uniforms they have largely replaced the previously sewn-on characters used to identify the players and their teams. For convenience we use the term "lettering" herein in connection with all such indicia, including non-alphanumeric symbols.

The lettering generally comprises an outer layer of plastic material bonded to a thermoplastic bonding substrate. The two-layer material is die-cut to form the individual characters and marketed to the user in that form. The user positions the characters on the fabric with the substrate side against the fabric and then applies heat and pressure to the characters. This plasticizes the substrate layers which then flow into the fabric and adhere to the fabric after the heat and pressure are removed.

Users of lettering of this type have encountered a problem in accurately maintaining the positions of the characters between the time they are located on the garments and the subsequent application of heat and pressure to bond them in place. This is especially true when all of the characters are positioned on the fabric and then sealed thereto in a single subsequent operation, as is desirable for efficient operation. Desirably, the lettering is placed on the garment at one station and the garment is then moved to another station, where an ironing device applies heat and pressure simultaneously to all of the characters.

In response to this problem, it has been proposed to use a tacky bonding layer to accomplish adhesion to the garment. Because of its tacky nature this layer temporarily holds the character in place until the heat-sealing operation is effected. The heat-sealing then plasticizes the bonding layer to accomplish permanent sealing in the manner described above. However, the bonds resulting from this system do not stand up sufficiently to laundering and dry cleaning operations, which greatly detracts from their use on many fabrics, particularly those used as athletic uniforms.

SUMMARY OF THE INVENTION

In accordance with the invention we have provided a multi-layer lettering material which comprises an outer surface layer bonded to a bonding substrate which includes a thermoplastic bonding layer as in previous materials and, in addition, a thin tacky adhesive layer on the surface of the bonding layer. The adhesive layer provides the desired temporary adhesion of the lettering to the underlying fabric. Yet, because it is sufficiently thin, it does not take part to any substantial degree in the final thermoplastic bond to the fabric. Rather, when heat and pressure are applied, the thermoplastic bonding layer works its way into intimate contact with the fabric and thereby provides the desired bond. This bond is as effective as those of the prior non-tacky lettering materials in resisting the effects of laundry and dry cleaning of the garment.

BRIEF DESCRIPTION OF THE DRAWING

The drawing is a cross-section of a composite labelling material embodying the invention.

DETAILED DESCRIPTION OF THE PREFERRED EMBODIMENTS

With reference to the drawing, a sheet of labelling material embodying the invention comprises an outer labelling layer 10 of suitable thermoplastic material, a thermoplastic bonding layer 12 bonded to the layer 10, a pressure-sensitive adhesive layer 14 on the under surface of the layer 12 and a protective sheet 16 of release paper on the under surface of the adhesive layer 14. The labelling layer 10 provides the outer, visible surface of the lettering. It can be of any material, such as polyvinyl chloride or polyester, which has been found suitable in the past for this purpose. Similarly the bonding layer 12 may be of any of the materials such as polyvinyl chloride, polyamide and polyester which have been found suitable in the past as bonding materials. The material of this layer should have a lower melting point than any thermoplastic in the labelling layer 10 so that the labelling layer will not undergo undue flow under the heat and pressure that are applied to activate the bonding layer.

The adhesive layer 14 can be any suitable pressure-sensitive adhesive material. It should not adversely affect the bonding properties of the bonding layer 12. This is accomplished primarily by making the adhesive layer substantially thinner than the bonding layer. For example, we have found a thickness of 1 mil suitable for the adhesive layer 14 when used with a bonding layer 12 having a thickness in the range of 3–7 mils.

A wide range of materials can be used for the adhesive layer 14. One that we have found particularly suitable is a mixture of ethylene vinyl acetate with a hydrogenated rosin ester and a petroleum-based lubricant. While ethylene vinyl acetate can be used alone as an adhesive in some applications, the addition of the hydrogenated rosin ester is desirable because it imparts increased tackiness, with the ethylene vinyl acetate serving also as a binder for the other material in this application. The lubricant serves to increase the tackiness at room temperature, which is the temperature at which the labelling material is usually initially applied to fabric substrates. The mixture is a hot melt adhesive and can thus be extruded or calendered onto the release bonding layer 12 or the release sheet 16.

As an example, we have used a mixture of ethylene vinyl acetate, marketed by U.S. Industrial Chemical Corporation under the trade designation Vynathene EY903, with hydrogenated rosin ester marketed by Hercules under the designation Foral 85 and a petroleum based lubricant marketed by Shell Oil Company under the designation Shellflex 371.

To manufacture the labelling material, the adhesive layer 14 is first applied to the bonding layer 12 and the release sheet is then applied to the adhesive layer. The resulting three-layer sheet is a bonding substrate that can then be sold to a converter who applies the labelling layer 10, whose color and material will depend on the particular application. The resulting product is then die cut to form the desired lettering or other indicia.

Alternatively, the entire labelling material can be manufactured in a single continuous process in which case the labelling layer 10 can be cast onto the upper surface of the bonding layer 12.

When the lettering cut from the labelling material is to be bonded to a garment, the release paper is first removed from the adhesive layer 14 and the character is positioned on the garment at the desired place. The adhesive layer 14 then holds the character in position until heat sealing is accomplished. During heat sealing, heat and pressure applied to the top surface of the composite material cause the bonding layer 12 to soften and work its way into the fabric. As it does so, it drives the pressure-sensitive adhesive material ahead of it. This provides the desired intimate contact between the bonding layer 12 and the fibers in the fabric, so that the material in the layer 12 envelops the fibers and thereby securely bonds the lettering to the fabric.

What is claimed as new and desired to be secured by Letters Patent of the United States is:

1. An improved multi-layer labelling material for attachment to a textile fabric or the like, for the purpose of displaying an indicium affixed to said fabric, wherein said material comprises:
   (A) a first, outer labelling layer, with a display surface and a bonding surface; and
   (B) a second, bonding layer of meltable thermoplastic material, bonded to said bonding surface of said labelling layer, said thermoplastic material being capable of melting at an elevated temperature and working its way into intimate contact with said fabric to form a bond,
   wherein the improvement comprises:
   a third, adhesive layer, substantially thinner than said bonding layer and bonded to the other surface of said bonding layer, comprising a tacky, displaceable, hot-melt, thermoplastic, pressure-sensitive adhesive material which has flow characteristics such that at said elevated temperature the adhesive layer melts and flows ahead of the melting thermoplastic material of said bonding layer, and is thus displaced by said melting material.

2. The labelling material of claim 1 further comprising a removable, protective release sheet adhered to said adhesive layer.

3. The labelling material of claim 1 wherein said adhesive layer is substantially coextensive with said bonding layer.

4. A bonding substrate bondable to an indicia display material, for attachment of said indicia display material to a textile fabric or the like, wherein said bonding substrate comprises:
   a bonding layer comprising a meltable thermoplastic material with a melting point lower than that of said display material, said thermoplastic material being capable of melting at an elevated temperature and working its way into intimate contact with said fabric to form a bond, and
   an adhesive layer, substantially thinner than said bonding layer and bonded to one surface of said bonding layer, comprising a tacky, displaceable, hot-melt, thermoplastic, pressure-sensitive adhesive material which has flow characteristics such that at said elevated temperature the adhesive layer melts and flows ahead of the melting thermoplastic material of said bonding layer and is thus displaced by said melting material.

5. The bonding substrate of claim 4 wherein said adhesive layer is substantially coextensive with said bonding layer.

6. The bonding substrate of claim 4 further comprising a removable, protective release sheet adhered to said adhesive layer.